Dec. 11, 1945.   I. W. BEMIS   2,390,865
ADJUSTABLE WORK SUPPORT FOR USE IN MACHINING OPERATIONS
Filed Dec. 27, 1943
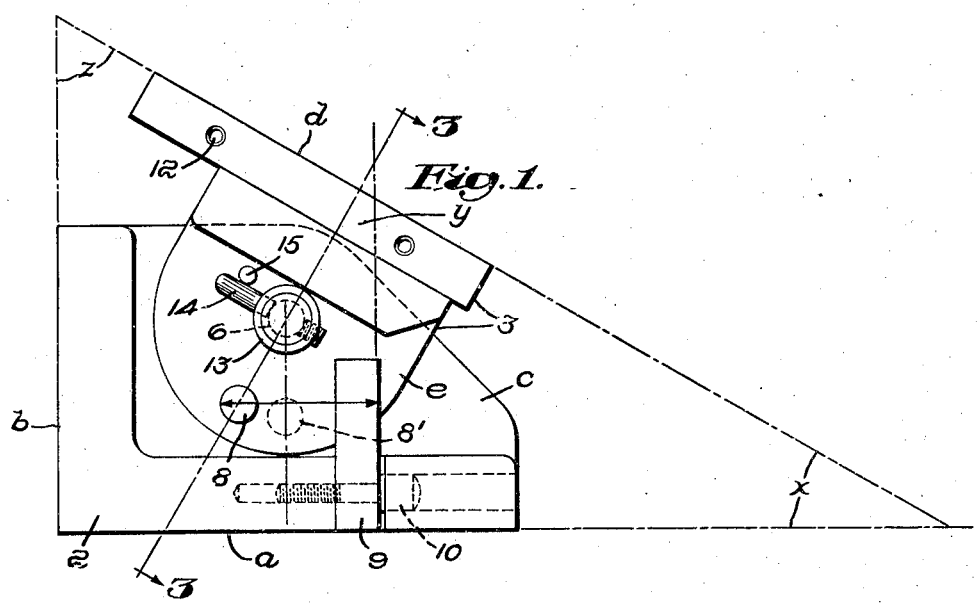
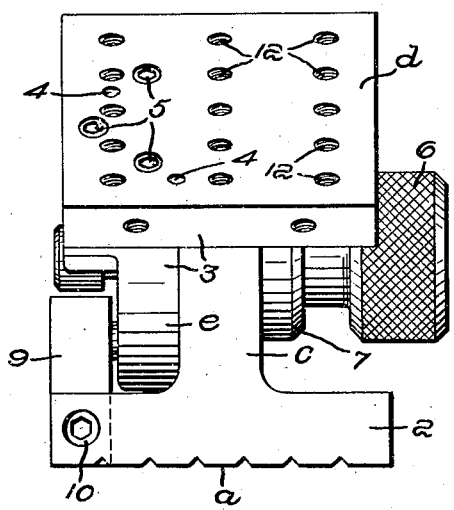
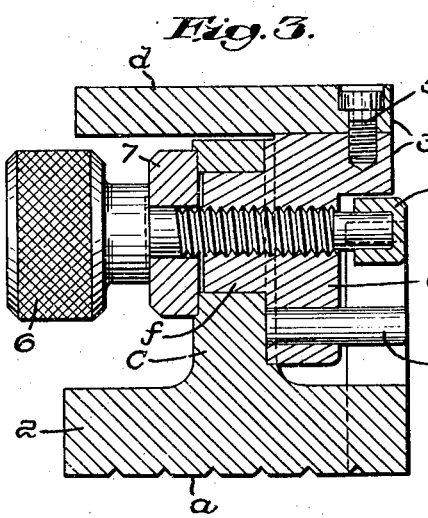
Inventor:
Irving W. Bemis,
by J. H. McCready,
Attorney.

Patented Dec. 11, 1945

2,390,865

UNITED STATES PATENT OFFICE 2,390,865

ADJUSTABLE WORK SUPPORT FOR USE IN MACHINING OPERATIONS

Irving W. Bemis, Natick, Mass.

Application December 27, 1943, Serial No. 515,680

1 Claim. (Cl. 33—174)

This invention relates to work supports and similar devices intended for use in holding articles of work in various angular positions with reference to a tool or implement of some kind designed to operate on the work.

It is the customary practice to provide such devices with a graduated sector or arcuate scale for measuring the various angles of adjustment. But this is not sufficiently accurate for fine work. The present invention aims to improve apparatus of this character by providing it with means whereby the angles can be measured easily, quickly, and with a higher degree of accuracy than that provided by the customary scales.

The nature of the invention will be readily understood from the following description when read in connection with the accompanying drawing, and the novel features will be particularly pointed out in the appended claim.

In the drawing,

Fig. 1 is a side elevation of a work support embodying this invention;

Fig. 2 is a front elevation of the device shown in Fig. 1; and

Fig. 3 is a sectional view taken approximately on the line 3—3, Fig. 1.

The device shown in the drawing comprises a support 2 provided with flat bottom and end faces $a$ and $b$, respectively, these faces being machined accurately and bearing a right angle relationship to each other. The support includes a central upright flange $c$ on which is pivoted a bracket 3, and this member is provided with a flat face $d$ on which to clamp or otherwise secure the work. Preferably the bracket is made in two pieces, one consisting of a flange $e$ and the other of a face plate or table removably secured to said flanges as, for example, by dowels 4, Fig. 2, and screws 5. The flange $e$ includes a laterally projecting stud or journal section $f$ fitting snugly into a hole bored and reamed horizontally in the flange $c$ of the support 2, and the adjacent vertical face of the cooperating upright faces of the two flanges $e$ and $c$ are accurately machined so that they always bear a right-angle relationship to the axis of the pivot stud $f$.

In order to clamp these parts in their adjusted relationship, a screw 6, provided with a knurled head, is threaded through the bracket member $e$, and a collar 7, Fig. 3, is interposed between the vertical surface of the head of the screw and the adjacent surface of the flange $c$, both the contacting faces of these parts being accurately made, so that when the screw 6 is tightened up, it pulls the bracket member $e$ firmly against one side of the flange $c$ and simultaneously clamps the collar 7 securely against the opposite surface of said flange. This locks the bracket 3 rigidly in its adjusted position on the support 2.

For the purpose of measuring accurately the angular relationship which the face $d$ of the bracket bears to the plane surfaces $a$ and $b$, a pin 8 is fixed in the bracket section $e$ and projects at right angles from it. Also, a post 9 of square or rectangular cross-section is set into the flange of the support 2 and is secured rigidly thereto by the screw 10, Fig. 2, so that, to all intents and purposes, except for manufacturing convenience, this post forms a projection integral with the support 2.

It will be observed that the axis of the pivot stud $f$ lies parallel to both the flat surfaces $a$ and $b$ and that said stud is concentric with the axis of the screw 6. By referring to the broken lines in Fig. 1, it will also be seen that the angle $x$ which the face $d$ makes with reference to the horizontal surface $a$ is equal to the angle $y$ which the plane of the right-hand face, Fig. 1, of the post 9, when extended upwardly, makes with the radial plane through the axes of the pivot stud $f$ and the pin 8. This is true in all angular positions of the bracket 3.

When the bracket is adjusted so that its surface $d$ is parallel to the horizontal face $a$ of the support 2, then the pin 8 occupies the position shown in dotted lines at 8', Fig. 1. In that position a vertical plane through the axis of the pin 8 is parallel to the plane of the right-hand side of the post 9, and the left hand side of said pin is located exactly one inch away from the right hand face of said post. The center of the pin 8 also is spaced exactly one inch from the axis of the pivot stud $f$. This may be regarded as the zero position of the device.

In using this article let us assume that the nature of the work fastened to the face plate requires some operation on it such that the face plate should be positioned at an angle of 35° and 14' from the horizontal. The sine of this angle is .5769", as can be found from any table of the natural values of trigonometric functions. Bearing in mind that in the zero position of the instrument it is just one inch from the left-hand side of the pin 8' to the right-hand face of the post 9, it will be evident that when the bracket 3 has been adjusted into the proper angle, the distance between the right-hand face of said post and the left-hand side of said pin should be 1.5769". This setting can be readily made by hand with the aid of a two inch micrometer, after which the bracket 3 can be secured in its adjusted position simply by tightening the screw 6.

In a device of this character it is difficult, if not impossible, to make the stationary surface from which the sine value is measured actually at the zero value of the angle. Hence the location of the measuring surface one inch away from the zero position. Also, for larger pieces of work it may be desirable to make the zero setting, say, two inches off instead of one inch, so that the sine value could be measured with a three inch micometer, and other variations can be made while still using the essential features of this invention.

Any other angular adjustment can be made and measured with a high degree of accuracy in the same way as above described up to 45°. Above that angle the device should be set on end and the sine value of the complement of the angle $x$ then can be used, that value being equal to the sine of the angle $z$, as is well known. For example, assume that the angle wanted is 57° and 29' from the horizontal—the complement of that angle is 90°—57° 29'=32° 31'. This sine value taken from the table is .5375. Accordingly, the micrometer is set for 1.5375". The bracket is then adjusted until the measuring distance equals that value, after which the adjusting screw is tightened up. At this time the device is used with the face $b$ as the horizontal surface.

Also, because the sine value of the complement of the angle of 57° and 29' (or any other acute angle) is the same as the cosine value of that angle, the latter can be used instead of taking the sine value of the complementary angle. Some workmen find it easier to use one method and some the other.

The face plate $d$ can be removed and replaced with any other suitable form of face plate whenever that is necessary or desirable to accommodate the particular work piece to be operated upon. Also, the upper surface and the edges of the face plate $d$ usually are drilled and tapped with holes, such as those shown at 12, adapted to receive screws for clamping articles of work to the support.

In order to release the bracket for adjusting movement, only a slight rotation of the screw 6 is necessary, and in order to limit this rotative movement and thus to prevent the operator from turning it far enough to produce excessive looseness, a cap 13 is secured to the end of the screw opposite to the head 6, and it carries a laterally projecting pin 14, Fig. 1, which, when the screw 6 has been loosened sufficiently to free the bracket for adjusting movement, engages another pin 15 and thus limits the degree of the loosening action.

Thus the various angular adjustments of the work supporting surface can be made quickly, easily, and with a high degree of accuracy. An important advantage of this construction is that relatively unskilled workmen can be taught far more quickly how to make these adjustments and to drill, machine, or grind their work accurately, than with the customary gauges and equipment commonly found even in the better grades of machine shops.

The measurement of the sine or cosine value of the angle may be made in other ways. For example, some workmen find it more convenient to make this measurement with gauges than with a micrometer caliper, and when they so desire, they can make the measurement between the adjacent surfaces of the pin 8 and the post 9 by means of gauges. In this method the distance between the right-hand surface of the pin 8 and the left-hand surface of the post 9, when the device is in its zero position, must be added to the sine value of the angle desired, or that for which the device is set, as the case may be, but this can readily be done and that fixed distance can be made of some value, say exactly a half inch, which will make this addition a simple matter and not likely to cause an error.

While I have herein shown and described a preferred embodiment of my invention, it will be evident that the invention may be embodied in other forms without departing from the spirit or scope thereof.

Having thus described my invention, what I desire to claim as new is:

A device of the character described comprising a support having two flat surfaces at right angles to each other, a bracket pivoted to said support with the axis of the pivot parallel to both of said surfaces, said bracket having a work supporting face bearing an acute angular relationship to both of said surfaces in its various positions of adjustment around said axis, a pin extending laterally from said bracket to swing in an arc centered in said axis and having a one inch radius, said support having a projection rigid therewith and provided with a flat face parallel to one of the above mentioned flat surfaces of said support, said pin being positioned between the latter surface and said face of said projection, the latter face being so located with reference to said pin that it always remains spaced from the pin by a distance equal to a fixed distance plus the sine or cosine value of the angle which the face of said bracket bears to one of said flat surfaces of the support, whereby the device can rest on either of said flat surfaces as a base and the sine or cosine value of the angle which the face of said bracket bears to the base surface so used can always be measured between the surface of said pin and said face of said projection.

IRVING W. BEMIS.